UNITED STATES PATENT OFFICE.

HEINRICH CARO, OF MANNHEIM, BADEN, GERMANY, ASSIGNOR TO BADISCHE ANILIN AND SODA FABRIK, OF SAME PLACE.

DYE-STUFF OR COLORING-MATTER.

SPECIFICATION forming part of Reissued Letters Patent No. 9,144, dated April 6, 1880.

Original No. 204,799, dated June 11, 1878. Application for reissue filed January 14, 1880.

*To all whom it may concern:*

Be it known that I, HEINRICH CARO, of Mannheim, in the Grand Duchy of Baden and Empire of Germany, have invented a new and useful Improvement in Dye-Stuffs or Coloring-Matters, which improvement is fully set forth in the following specification.

This invention relates to a red coloring-matter which, in chemical language, may be termed "sulpho-acid of beta oxyazo-naphthaline."

In preparing my new coloring-matter I proceed as follows: I take naphthylamine and convert it into its diazo compound by the action of nitrous acid, and in a manner well known to chemists; and equal molecules of the diazo compound thus obtained and of naphthol or naphthylic alcohol are allowed to react upon each other, by preference in an alkaline solution. According to the employment of either of the two isomeric modifications of naphthylic alcohol, known as "alpha-naphthol" and "beta-naphthol," the result of this operation is a precipitate containing either of the two corresponding and isomeric modifications of oxyazo-naphthaline, and which may be termed the "alpha" and "beta" oxyazo-naphthaline. The beta-oxyazo-naphthaline, obtained as above described, is then converted into its sulpho-acids by any methods now in use for the preparation of organic sulpho-acids—such as, for instance, by heating it with fuming sulphuric acid until the mixture is found to produce a clear solution in water. The excess of sulphuric acid may then be removed by any of the known means for effecting this purpose, and the red coloring-matter may be obtained in a solid state by precipitation or evaporation.

Instead of bringing the diazo compound of naphthylamine together with beta-naphthol, and then converting the compound thus obtained into its sulpho-acids, I can convert the beta-naphthol into its sulpho-acid before it is brought to react on the diazo compound of naphthylamine. After the beta-naphthol has been converted into its sulpho-acid, equal molecules of the diazo compound of naphthylamine and of the sulpho-acid of beta-naphthol are caused to react on each other, by preference in an alkaline solution. The result of this operation is my red coloring-matter, which can be obtained in a solid state, either by precipitation or evaporation.

The same result may also be obtained by first converting the naphthylamine into its sulpho-acids, then producing from such sulpho-acids of naphthylamine their diazo compounds, and allowing equal molecules of the diazo compounds thus obtained and of beta-naphthol to react upon each other, by preference in an alkaline solution.

As is well known, the sulpho-acids of naphthylamine may be produced in various ways—as, for instance, by the direct action of sulphuric acid on naphthylamine, or, in a less direct manner, by heating nitro-naphthaline with sulphite of ammonium, or by submitting the sulpho-acids of nitro-naphthaline to the action of reducing agents.

According to the method employed, several modifications of the sulpho-acid of naphthylamine are obtained, chiefly differing from each other by their various degrees of solubility in water, some of them being nearly insoluble, such as the so-called "naphthionic acid." All these modifications of the sulpho-acid of naphthylamine may be converted into the corresponding sulpho-acids of oxyazo-naphthaline in the manner above described, and the coloring-matters obtained chiefly differ in their various degrees of solubility.

The red coloring-matter obtained by either of the methods above described when produced in the form of a powder has a dark-brown color. It is a strong organic acid, which forms salts or saline compounds with salifiable bases, the alkaline salts being more soluble in water than those obtained from alkaline earths or metallic oxides. For these reasons I prefer to prepare the commercial product in the form of a sodium compound, which has the appearance of a dark-red powder; but I do not wish to confine myself to this sodium compound, but I reserve the right to prepare my red coloring-matter for the market in any suitable manner, or to sell it without further preparation.

In concentrated sulphuric acid my red coloring-matter dissolves with a purplish-blue color. The dyeing is effected in an acid bath.

What I claim as new, and desire to secure by Letters Patent, is—

As a new manufacture, the coloring-matter or dye-stuff obtained from the reaction of the diazo compound of the sulpho-acid of naphthylamine and beta-naphthol, substantially in the manner set forth, or by any other method which will produce a like result.

HEINRICH CARO. [L. S.]

Witnesses:

HEINRICH SCHAEFFER,
CASPAR V. SCHMIDT.